UNITED STATES PATENT OFFICE.

FRANCIS M. IRONMONGER, OF NORFOLK, VIRGINIA.

IMPROVEMENT IN BLEACHING PEA-NUTS.

Specification forming part of Letters Patent No. 126,550, dated May 7, 1872.

*To all whom it may concern:*

Be it known that I, FRANCIS M. IRONMONGER, of Norfolk, in the county of Norfolk and State of Virginia, have invented a new and valuable Improvement in the Art or Process of Bleaching Pea-Nuts; and I do hereby declare that the following is a full, clear, and exact description of the same.

This invention has relation to the cleaning and bleaching of the shells of pea-nuts; and consists in the following-described process:

Take one hundred gallons of clear, cold water and dissolve therein one-half pound of sal-soda. Wash the nuts well in this solution till they are clear of dirt, then remove and immerse them in a vessel of water to which is added chloride of lime and sulphuric acid in the proportions of fifty pounds of the former with twelve and one-half pounds of the latter to every one hundred gallons of water. Allow the pea-nuts to remain in this solution until sufficiently whitened; the time required will be one hour, more or less, according to the nature of the various nuts; then take out the pea-nuts and wash them in clear water to remove the chlorine. To the water a small quantity of muriatic acid should be added if there be any calcareous matter on the nuts. After being cleaned the nuts are to be spread upon driers or trays and exposed to the sun until dry, when they are ready to bag.

This process is designed to clean and bleach pea-nuts in order to render them more attractive, and thereby more saleable. Pea-nuts of good quality having dark shells are less sought after than those having clean light shells.

My process renders the pea-nuts clean, and makes them as marketable as those having naturally whitened shells.

What I claim as my invention, and desire to secure by Letters Patent, is—

The process for cleaning and bleaching peanut shells, substantially as specified.

In testimony that I claim the above I have hereunto subscribed my name in the presence of two witnesses.

FRANCIS M. IRONMONGER.

Witnesses.
    JNO. G. SIBLEY,
    JNO. T. RAINIER.